US007151994B2

(12) United States Patent
Fuwa

(10) Patent No.: US 7,151,994 B2
(45) Date of Patent: Dec. 19, 2006

(54) CALCULATION OF AIR CHARGE AMOUNT IN INTERNAL COMBUSTION ENGINE

(75) Inventor: Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/544,125

(22) PCT Filed: Jan. 13, 2004

(86) PCT No.: PCT/JP2004/000166

§ 371 (c)(1), (2), (4) Date: Aug. 2, 2005

(87) PCT Pub. No.: WO2004/070185

PCT Pub. Date: Aug. 19, 2004

(65) Prior Publication Data

US 2006/0037596 A1 Feb. 23, 2006

(30) Foreign Application Priority Data

Feb. 5, 2003 (JP) ............................ 2003-028113

(51) Int. Cl.
*G06F 19/00* (2006.01)
*F02D 41/00* (2006.01)

(52) U.S. Cl. ................... 701/114; 123/681; 123/90.15; 123/478

(58) Field of Classification Search ................ 701/103, 701/104, 114, 115; 123/681–684, 690, 478, 123/480, 90.11, 90.15; 73/118.2
See application file for complete search history.

(56) References Cited

U.S. PATENT DOCUMENTS 6,349,592 B1 2/2002 Hirasawa et al.
6,370,935 B1 * 4/2002 He et al. ..................... 73/1.34
6,405,122 B1 * 6/2002 Yamaguchi ................. 701/106
6,561,016 B1 * 5/2003 Suhre et al. ............... 73/118.2
6,760,656 B1 * 7/2004 Matthews et al. .......... 701/101
7,003,390 B1 * 2/2006 Kaga .......................... 701/101
2002/0107630 A1 8/2002 Yagi
2003/0191575 A1 * 10/2003 Wright ....................... 701/104
2003/0220732 A1 * 11/2003 Matthews et al. .......... 701/103
2005/0065707 A1 * 3/2005 Kaga .......................... 701/103
2006/0021344 A1 * 2/2006 Barba et al. .................. 60/599

FOREIGN PATENT DOCUMENTS

EP 1 179 668 A3 2/2002
JP A 2001-50090 2/2001
JP A 2002-130042 5/2002
JP A 2002-309993 10/2002
WO WO 02/059471 A1 8/2002

* cited by examiner

*Primary Examiner*—John T. Kwon
(74) *Attorney, Agent, or Firm*—Oliff & Berridge, PLC

(57) ABSTRACT

Calculation models (22, 24) for an in-cylinder air charge amount determine an estimated intake air pressure (Pe) based on an intake air flow rate (Ms), and then determine an air charge amount (Mc) from the estimated intake air pressure (Pe). A correction execution module (26) corrects, while a vehicle is traveling, the calculation model based on the relationship between the estimated intake air pressure (Pe) and a measured intake air pressure (Ps).

12 Claims, 8 Drawing Sheets

Example of calculation model

Intake valve model

CALCULATION OF AIR CHARGE AMOUNT IN INTERNAL COMBUSTION ENGINE

TECHNICAL FIELD

The present invention relates to technology for calculating air charge amount in an internal combustion engine installed in a vehicle.

BACKGROUND ART

The following two methods are the principal methods used currently to determine air charge amount in an internal combustion engine. The first method is one that uses intake air flow measured by a flow rate sensor (called an "air flow meter") disposed on the intake path. The second method is one that uses pressure measured by a pressure sensor disposed on the intake path. A method using a combination of a flow rate sensor and a pressure sensor to calculate air charge amount more accurately has also been proposed (JP2001-50090A).

However, measuring instruments such as flow rate sensors and pressure sensors sometimes have appreciably different characteristics among individual measuring instruments. Also, accuracy when calculating air charge amount from measurements taken by a flow rate sensor or a pressure sensor is affected by individual differences among constituent elements of internal combustion engines. Also, even in cases where air charge amount can be calculated correctly at the outset of use of an internal combustion engine, in some instances accuracy of calculation of air charge amount may drop due to change over time. Thus, in the past, it was not always possible to calculate accurately the air charge amount in an internal combustion engine.

DISCLOSURE OF THE INVENTION

An object of the present invention is to provide technology for calculating air charge amount of an internal combustion engine with greater accuracy than the conventional methods.

An aspect of the present invention is a control device for an internal combustion engine installed in an automobile, wherein the control device comprises: a flow rate sensor for measuring fresh air flow in an intake air passage connected to a combustion chamber of the internal combustion engine; an air charge amount calculation module for calculating air charge amount to the combustion chamber according to a calculation model that includes as parameters measurements by the flow rate sensor and pressure within the intake air passage; a pressure sensor for measuring pressure within the intake air passage; and a correction execution module for correcting the calculation model based on measurement by the flow rate sensor and measurement by the pressure sensor.

With this device, since the calculation model is corrected on the basis of measurements by a flow rate sensor and a pressure sensor, error due to individual differences among constituent elements of internal combustion engine or to change over time can be compensated for. As a result, it is possible to calculate air charge amount with greater accuracy than the conventional device.

The present invention can be embodied in various forms, for example, an internal combustion engine control device or method; an air charge amount calculation device or method; a engine or vehicle equipped with such a device; a computer program for realizing the functions of such a device or method; a recording medium having such a computer program recorded thereon; or various other forms.

BEST MODE FOR CARRYING OUT THE INVENTION

The embodiments of the invention are described hereinbelow on the basis of embodiments, in the indicated order.

A. Device Arrangement

B. Embodiment 1 of Calculation Model Correction

C. Embodiment 2 of Calculation Model Correction

D: Variant Examples:

A. Device Arrangement

Figure 1:
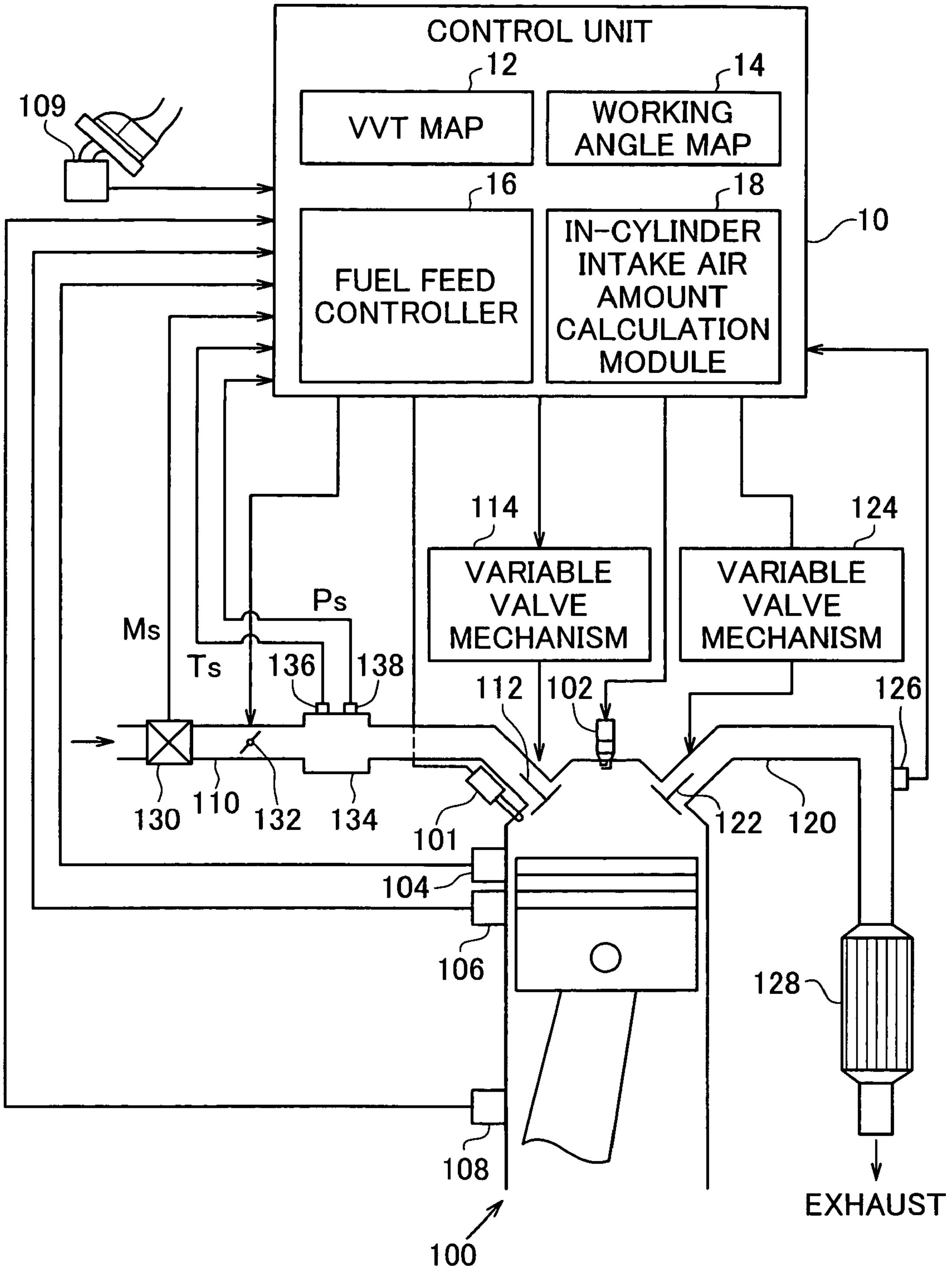
FIG. 1 is a conceptual diagram depicting the arrangement of a control device as an embodiment of the present invention.

FIG. 1 is a conceptual diagram depicting the arrangement of a control device as an embodiment of the present invention. This control device is configured as a device for controlling a gasoline engine 100 installed in a vehicle. The engine 100 comprises an intake air line 110 for supplying air (fresh air) to the combustion chamber, and an exhaust line 120 for expelling exhaust to the outside from the combustion chamber. Within the combustion chamber are disposed a fuel injection valve 101 for injecting fuel into the combustion chamber, a spark plug 102 for igniting the mixture in the combustion chamber, an intake valve 122, and an exhaust valve 122.

On the intake air line 110 are disposed, in order from the upstream end, an air flow meter 130 (flow rate sensor) for measuring intake air flow rate; a throttle valve for adjusting intake air flow rate; and a surge tank 134. In the surge tank 134 are disposed a temperature sensor 136 (intake air temperature sensor) and a pressure sensor 138 (intake air pressure sensor). Downstream from the surge tank 134, the intake air passage splits into a plurality of branch lines connected to the plurality of combustion chambers; in FIG. 1 however, for the sake of simplicity only one branch line is shown. On the exhaust line 120 are disposed an air-fuel ratio sensor 126 and a catalyst 128 for eliminating harmful components in exhaust gases. It is possible for the air flow meter 130 and the pressure sensor 138 to be situated at other locations. In this embodiment, fuel is injected directly into the combustion chamber, but it would be acceptable as well to inject the fuel into the intake air line 110.

The engine 100 is switched between intake operation and exhaust operation by means of opening and closing of the intake valve 112 and the exhaust valve 122. The intake valve 112 and the exhaust valve 122 are each provided with a variable valve mechanism 114, 124 for adjusting opening/closing timing. These variable valve mechanisms 114, 124 feature variable length of the open valve time period (so-called working angle) and position of the open valve time period (termed the "phase of the open valve time period" or the "VVT (Variable Valve Timing) position"). As variable valve mechanisms it would be possible to employ, for example, that disclosed in JP2001-263015A filed by the Applicant. Alternatively, it would be possible to use a variable valve mechanism that uses an electromagnetic valve to vary the working angle and phase.

Operation of the engine 100 is controlled by the control unit 10. The control unit 10 is constituted as a microcomputer comprising an internal CPU, RAM, and ROM. Signals from various sensors are presented to the control unit 10. In addition to the aforementioned sensors 136, 138, and 126, these sensors include a knock sensor 104, a water temperature sensor 106 for sensing engine water temperature, a revolution sensor 108 for sensing engine revolution, and an accelerator sensor 109.

In memory (not shown) in the control unit 10 are stored a VVT map 12 for establishing the phase of the open valve time period (i.e. the VVT position) of the intake valve 12, and an working angle map 14 for establishing the working angle of the intake valve 112. These maps are used for setting operating status of the variable valve mechanisms 114, 124 and the spark plug 102 with reference to engine revolution, load, engine water temperature and so on. Also stored in memory in the control unit 10 are programs for executing the functions of a fuel feed control module 16 that controls the fuel feed rate to the combustion chamber by the fuel injection valve 101, and of an in-cylinder intake air amount calculation module 18.

Figure 2:
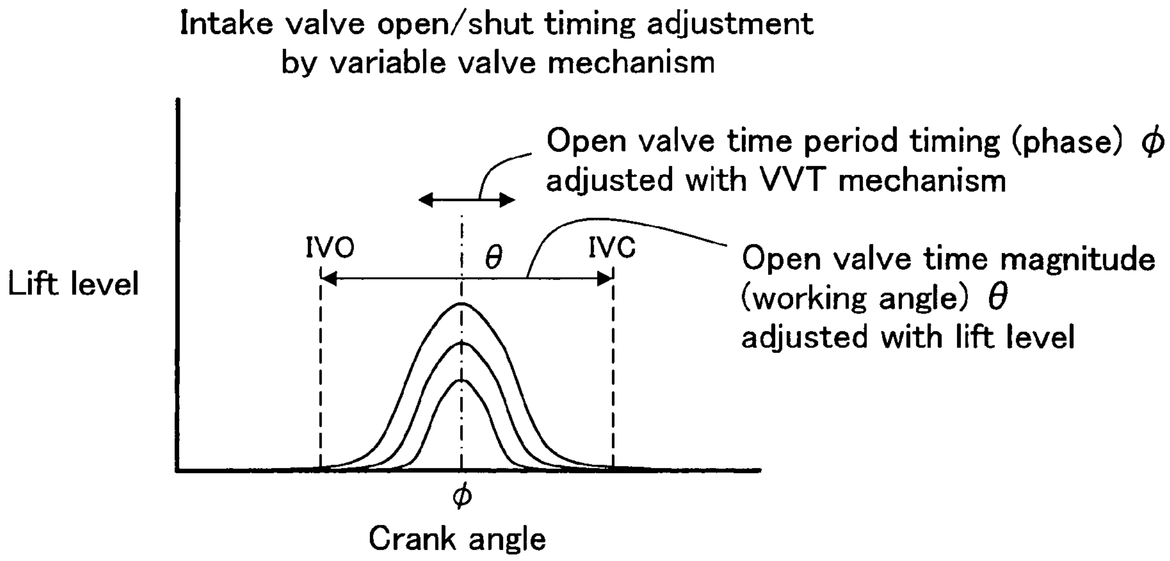
FIG. 2 is a diagram depicting adjustment of opening/closing timing of the intake valve 112 by the variable valve mechanism 114.

FIG. 2 is a diagram depicting adjustment of opening/closing timing of the intake valve 112 by the variable valve mechanism 114. With the variable valve mechanism 114 of this embodiment, the length of the open valve time period (working angle) θ is adjusted by means of changing the lift level of the valve shaft. The phase of the open valve time period (center of the open valve time period) φ is adjusted using the VVT mechanism (variable valve timing mechanism) belonging to the variable valve mechanism 114. This variable valve mechanism 114 enables intake valve 112 working angle and open valve time period phase to be modified independently. Accordingly, intake valve 112 working angle and open valve time period phase can each be set to respectively favorable conditions, with reference to engine 100 operating conditions. The variable valve mechanism 124 of the exhaust valve 122 has the same features.

B. Embodiment 1 of Calculation Model Correction

Figure 3:
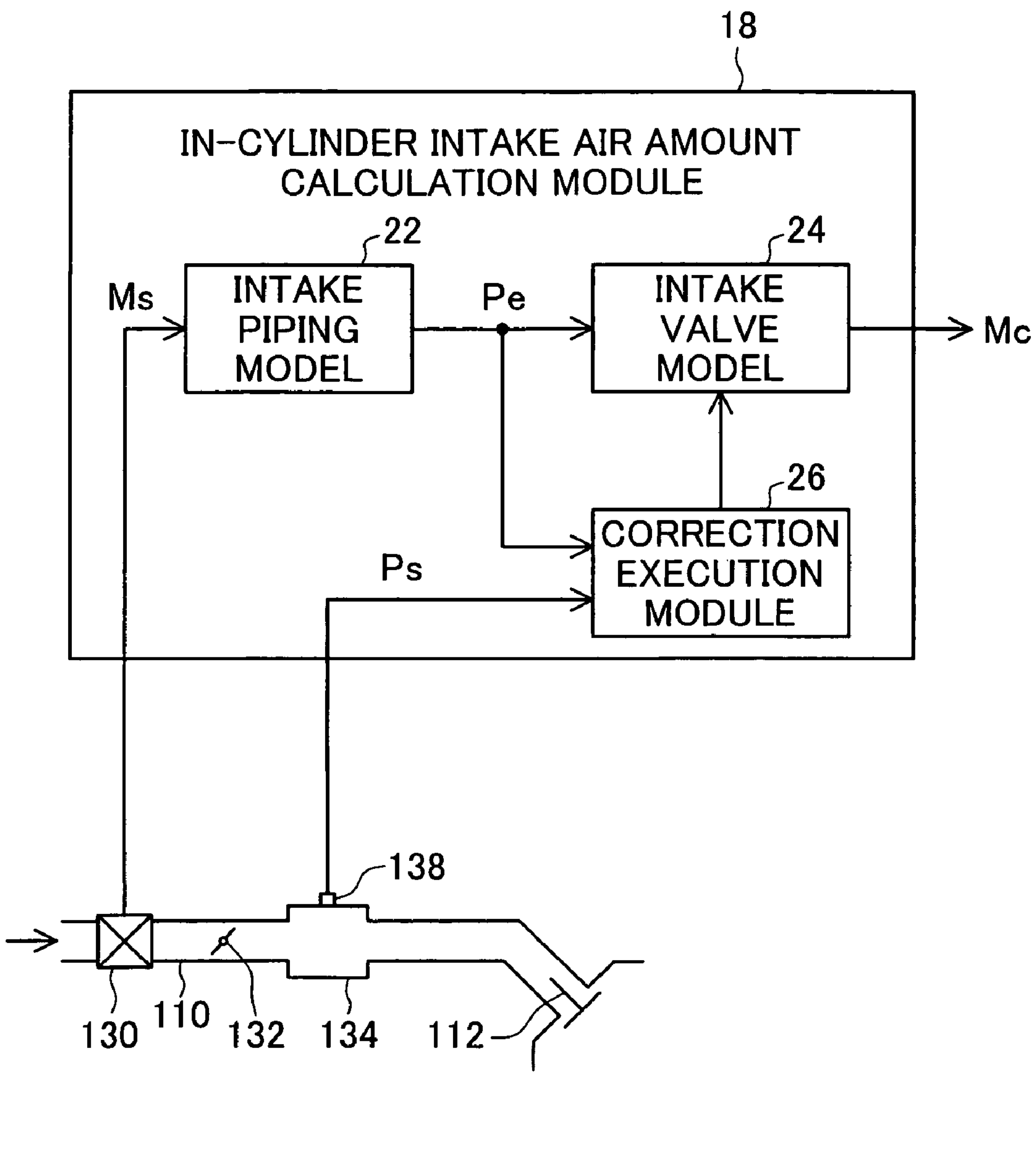
FIG. 3 is a block diagram depicting the arrangement of the in-cylinder intake air amount calculation module 18.

FIG. 3 is a block diagram depicting the arrangement of the in-cylinder intake air amount calculation module 18. The in-cylinder intake air amount calculation module 18 includes an intake piping model 22, an intake valve model 24, and a correction execution module 26. The intake piping model 22 is a model for calculating an estimated value Pe for intake air pressure (hereinafter termed "estimated intake air pressure") in the surge tank 134 on the basis of the output signal Ms of the air flow meter 130. The intake valve model 24 is a model for calculating in-cylinder air charge amount Mc on the basis of this estimated intake air pressure Pe. Here, "in-cylinder air charge amount Mc" refers to the amount of air introduced into the combustion chamber during a single combustion cycle of the combustion chamber. The correction execution module 26 executes correction of the intake valve model 24 on the basis of intake air pressure Ps measured by the pressure sensor 138 (termed "measured intake air pressure") and estimated intake air pressure derived with the intake piping model 22.

Figure 4A:
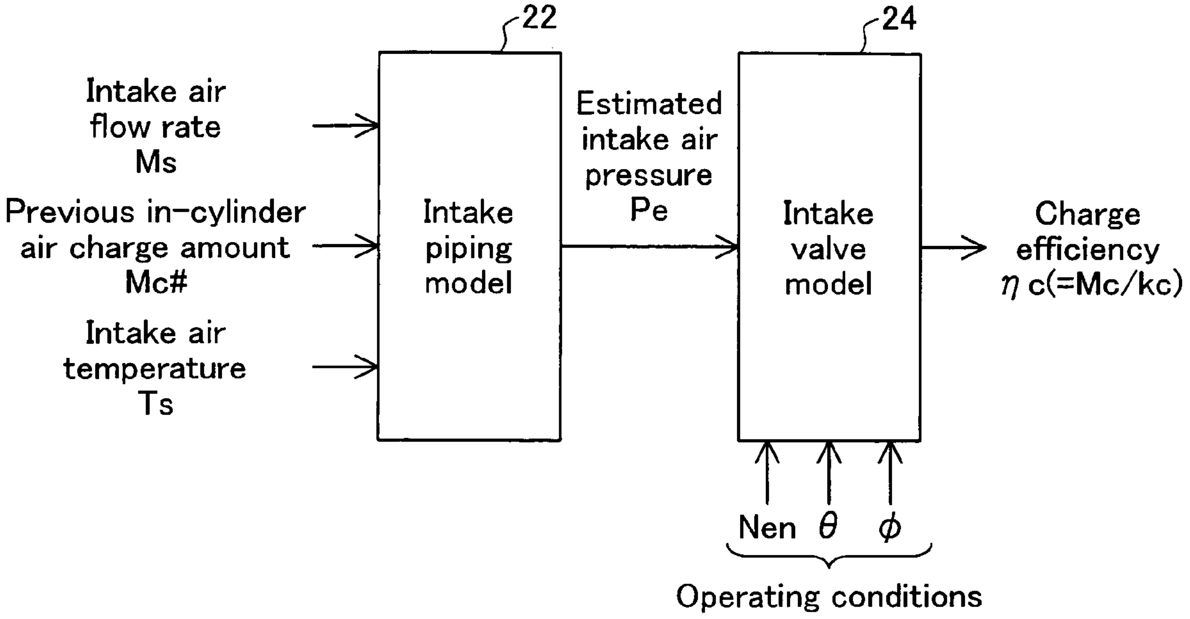
FIGS. 4(A) and 4(B) illustrate an example of the intake piping model and the intake valve model 24.
Figure 4B:
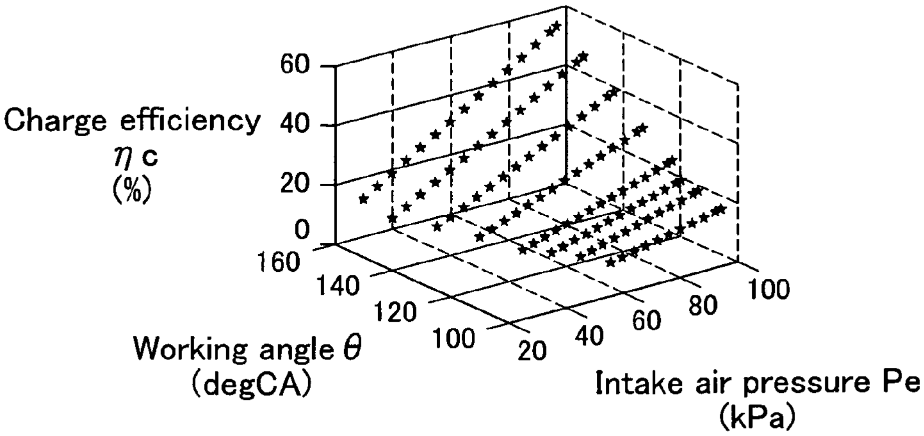

FIGS. 4(A) and 4(B) illustrate an example of the intake piping model and the intake valve model 24. This intake piping model 22 calculates estimated intake air pressure Pe using as inputs, in addition to the intake air flow rate Ms, the in-cylinder air charge amount Mc# at the time of the previous calculation (described later) and the intake air temperature Ts. The intake piping model can be represented by the following Eq. (1), for example.

$$\frac{dP_e}{dt} = \frac{RT_s}{V}(M_s - M_c) \tag{1}$$

Here, Pe denotes estimated intake air pressure, t denotes time, R denotes the gas constant, Ts denotes intake air temperature, V denotes total volume of the intake air line downstream from the air flow meter 130, Ms denotes intake air flow rate (mol/sec) measured by the air flow meter 130, and Mc is a value derived by converting in-cylinder air charge amount to flow rate (mol/sec) per unit of time. When Eq. (1) is integrated, estimated intake air pressure Pe is given by Eq. (2).

$$\begin{aligned} P_e &= \int dP_e \\ &= \int \frac{RT_s}{V}(M_s - M_c)\,dt \\ &= k\frac{RT_s}{V}(M_s - M_c^{\#})\Delta t + P_c^{\#} \end{aligned} \tag{2}$$

Here, k is a constant, Δt denotes the period for performing calculation with Eq. (2), Mc# denotes in-cylinder air charge amount at the time of the previous calculation, and Pe# denotes estimated intake air pressure at the time of the previous calculation. Since the values on the right side of Eq. (2) are known, according to Eq. (2) estimated intake air pressure Pe can be calculated for a given time interval Δt.

In preferred practice the intake air temperature Ts may be measured by the temperature sensor 136 (FIG. 1) disposed in the intake air line 110; however, measurement by another temperature sensor that measures outside air temperature may be used as the intake air temperature Ts instead.

The intake valve model 24 has a map indicating the relationship between estimated intake air pressure Pe and charge efficiency ηc. That is, charge efficiency ηc can be derived when estimated intake air pressure Pe given by the intake piping model 22 is input into the intake valve model 24. As is well known, charge efficiency ηc is proportional to the in-cylinder air charge amount Mc in accordance with Eq. (3)

$$M_c = k_c \cdot \eta_c \tag{3}$$

Here, kc is a constant. Plural maps of the relationship between estimated intake air pressure Pe and charge efficiency ηc are prepared with reference to operating conditions (Nen, θ, φ), with the appropriate map being selected depending on operating conditions. In this embodiment, the operating conditions used in the intake valve model 24 are defined by three operating parameters, namely, engine revolution Nen, and the working angle θ and phase ϕ (FIG. 2) of intake valve 112.

FIG. 4(B) shows an example of a map of the intake valve model 24 having working angle θ as a parameter. Here, a relationship between estimated intake air pressure Pe and charge efficiency ηc is established for each working angle θ. By using such a map, charge efficiency ηc can be derived from estimated intake air pressure Pe.

In the intake valve model 24, since charge efficiency ηc is dependent on the parameters Pe, Nen, θ, and ϕ, charge efficiency ηc is a function of these parameters, as indicated by Eq. (4) following.

$$\eta_c=\eta_c(P_e, N_{en}, \theta, \phi) \quad (4)$$

In-cylinder air charge amount Mc can be written as Eq. (5) below, for example.

$$M_c = k_c \cdot \eta_c = \frac{T_s}{T_c}(k_a \cdot P_e - k_b) \quad (5)$$

Here, Ts denotes intake air temperature, Tc denotes in-cylinder gas temperature, and ka and kb are coefficients. These coefficients ka, kb are values established with reference to operating conditions (Nen, θ, ϕ). Where Eq. (5) is used, it is possible to derive charge efficiency ηc from estimated intake air pressure Pe, using measured or estimated values for intake air temperature Ts and in-cylinder gas temperature Tc, and parameters ka, kb determined with reference to operating conditions.

It is possible to calculate in-cylinder air charge amount Mc using Eq. (2) and Eq. (5) given previously. In this case, estimated intake air pressure Pe is first calculated in accordance with the intake piping model 22 of Eq. (2). At this time, the value of in-cylinder air charge amount Mc# derived in accordance with the intake valve model 24 of Eq. (5) at the time of the previous calculation is used. Then, using this estimated intake air pressure Pe, current in-cylinder air charge amount Mc (or charge efficiency ηc) is calculated in accordance with the intake valve model 24 of Eq. (5).

From the preceding description it will be understood that with the calculation models of the embodiment, calculation of estimated intake air pressure Pe by means of the intake piping model 22 utilizes the calculation result Mc# of the intake valve model 24. Accordingly, when an error occurs in the intake valve model 24, an error will be produced in the estimated intake air pressure Pe as well.

Where an intake valve having a variable valve mechanism is employed, there is a high likelihood that the intake valve model 24 will change over time. One reason for this is that deposits form in the gap between the valve body of the intake valve and the intake port of the combustion chamber, as a result of which the relationship of valve opening and flow passage resistance changes. Such change over time in flow passage resistance at the valve location has a particularly appreciable effect under operating conditions in which the working angle ϕ (FIG. 2) is small. On the other hand, with an ordinary valve not equipped with a variable valve mechanism (i.e. a valve performing on/off operation only), since the working angle ϕ does not change, such problems are infrequent. Accordingly, change over time in flow passage resistance at the valve location represents a greater problem in variable valve mechanisms.

Among variable valve mechanisms with variable working angle ϕ, there are a first type wherein the working angle ϕ changes depending on change in lift as depicted in exemplary fashion in FIG. 2; and a second type wherein only the working angle ϕ changes, with lift held constant at its maximum value. Change over time in flow passage resistance at the valve location is particularly notable in variable valve mechanisms of the first type.

In this way, there occur instances in which error is produced in the intake piping model 22 and the intake valve model 24, due to change over time in the intake system of the engine. In some instances error may be produced in the intake piping model 22 and the intake valve model 24 due to individual differences in engines or individual differences among sensors 130, 138 as well. Accordingly, in the embodiment, such errors are compensated for by correcting the models 22, 24, during operation of the vehicle.

Figure 5:
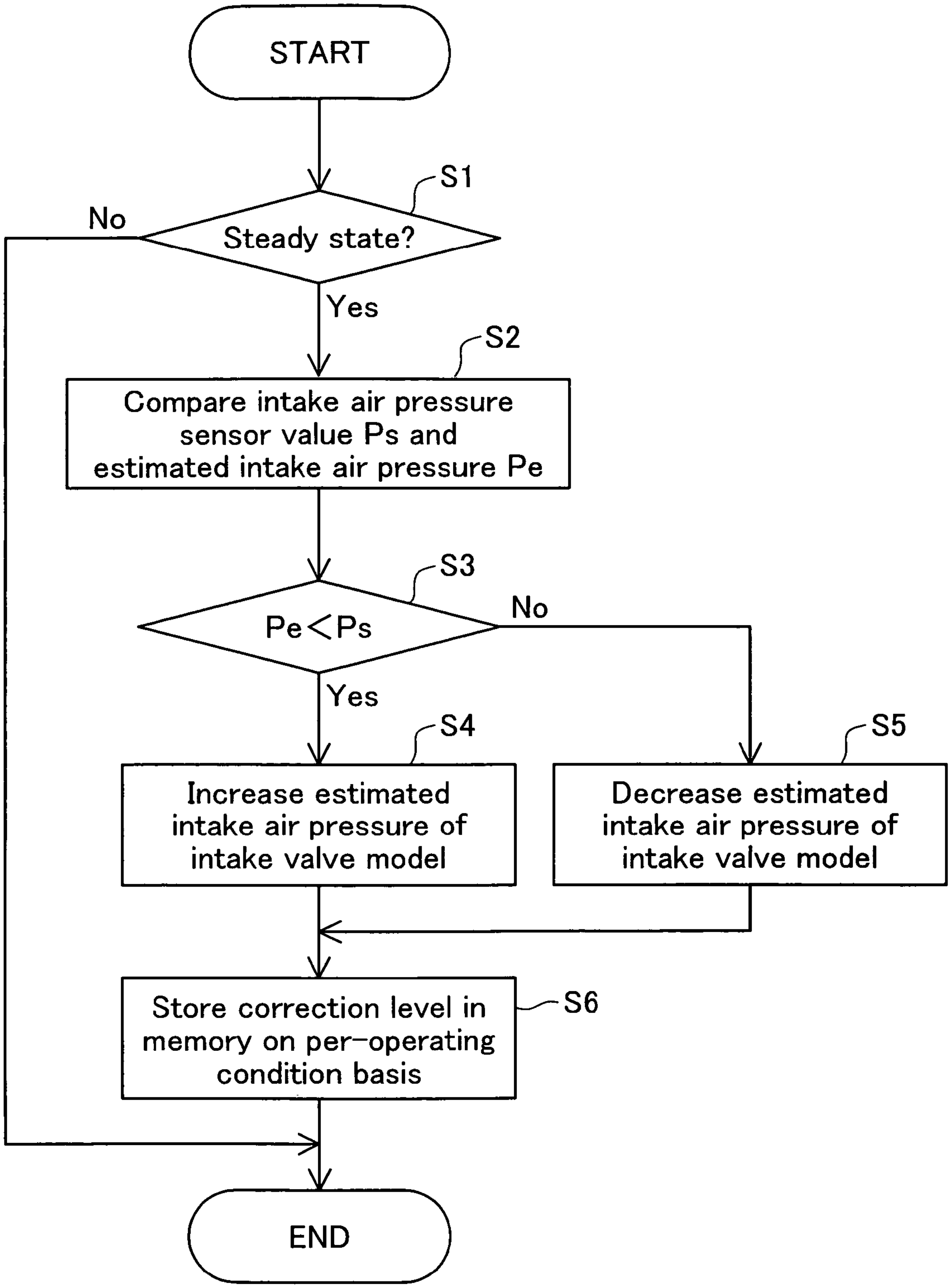
FIG. 5 is a flowchart illustrating the model correction procedure in Embodiment 1.

FIG. 5 is a flowchart illustrating the routine for executing correction of the calculation model for in-cylinder air charge amount Mc in Embodiment 1. This routine is repeated at predetermined time intervals.

In Step S1, the correction execution module 26 determines whether operation of the engine 100 is in a steady state. Here, "steady state" refers to substantially constant revolution and load (torque) of the engine 100. Specifically, the engine may be determined to be in a "steady state" when engine revolution and load remain within a range of ±5% of their respective average values during a predetermined time interval (of 3 seconds, for example).

When the engine is determined not to be in a steady state, the routine of FIG. 5 is terminated, whereas if determined to be in a steady state, the correction process beginning with Step S2 is executed. In Step S2, estimated intake air pressure Pe is derived in accordance with the intake piping model 22 on the basis of intake air flow rate Ms (FIG. 3) measured by the air flow meter 130, and this is compared with measured intake air pressure Ps measured by the pressure sensor 138. In the event that the estimated intake air pressure Pe is less than the measured intake air pressure Ps, the correction process of Step S4 is executed, and in the event that the estimated intake air pressure Pe is greater than the measured intake air pressure Ps, the correction process of Step S5 is executed.

Figure 6:
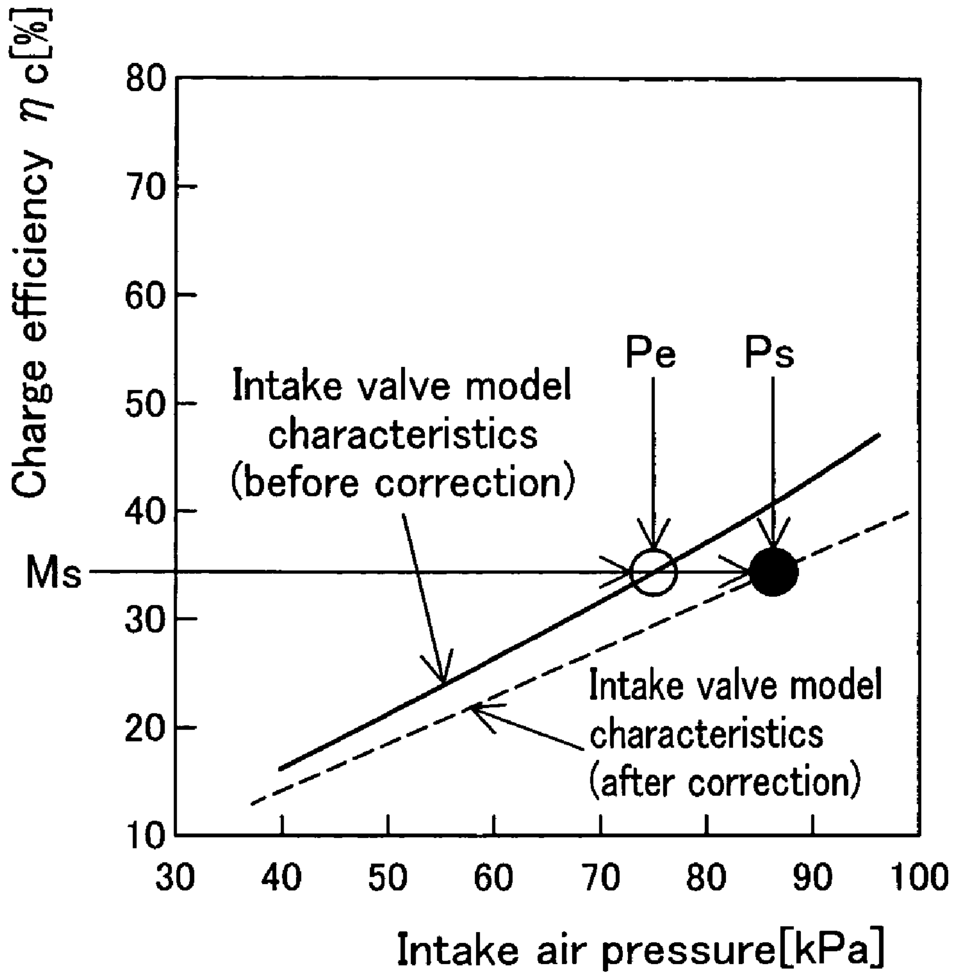
FIG. 6 is a diagram depicting an example of the correction processes in Steps S4 and S5.

FIG. 6 is a diagram depicting an example of the correction processes in Steps S4 and S5. The drawing depicts the characteristics of the intake valve model 24, with the horizontal axis denoting intake air pressure Pe and the vertical axis denoting charge efficiency ηc. In the event that a correction process is carried out, since the engine 100 is in a steady state, the intake air flow rate Ms measured by the air flow meter 130 will be proportional to the in-cylinder air charge amount Mc. Accordingly, the value of charge efficiency ηc can be derived by dividing the intake air flow rate Ms measured by the air flow meter 130, by a predetermined constant. Since this charge efficiency ηc (=Mc/kc) is used when deriving estimated intake air pressure Pe by the aforementioned Eq. (2), the relationship between charge efficiency ηc and estimated intake air pressure Pe in the intake valve model 24 lies on the initial characteristic curve prior to correction (shown by the solid line). In some instances, however, measured intake air pressure Ps may not coincide with this estimated intake air pressure Pe. In such instances, in Step S4 or S5, the characteristics of the intake valve model 24 are corrected so that estimated intake air pressure Pe now coincides with measured intake air pressure Ps. Specifically, as shown by way of example in FIG. 6, where estimated intake air pressure Pe is less than measured intake air pressure Ps, in Step S4 the intake valve model 24 is adjusted so as to increase estimated intake air pressure Pe.

Where estimated intake air pressure Pe is greater than measured intake air pressure Ps, on the other hand, in Step S5 the intake valve model 24 is adjusted so as to decrease estimated intake air pressure Pe. In the embodiment, since the intake valve model 24 is represented by Eq. (5), correction of the intake valve model 24 means adjusting the coefficients ka, kb.

In Step S6, the intake valve model 24 corrected in this manner is stored on a per-operating condition basis. Specifically, coefficients ka, kb of Eq. (5) are associated with the operating conditions at the time that the routine of FIG. 5 is executed, and stored in nonvolatile memory (not shown) in the control unit 10. Subsequently, since the corrected model is used, in-cylinder air charge amount Mc can be calculated with greater accuracy. During vehicle operation it is common for engine revolution and load to vary gradually. In such instances as well, by utilizing the corrected models 22, 24, it is possible to correctly calculate in-cylinder air charge amount Mc on the basis of measured intake air flow rate Ms measured by the air flow meter 130.

Corrections made to an in-cylinder intake air amount calculation model under given operating conditions may be applied to the coefficients ka, kb for other similar operating conditions. For example, when the characteristics of in-cylinder intake air amount calculation models 22, 24 are associated with operating conditions specified in terms of three operating parameters (engine revolution Nen, intake valve working angle $\theta$, and phase $\phi$ of the open valve time period of the intake valve), the characteristics of the in-cylinder intake air amount calculation models at other operating conditions wherein the operating parameters are within a range of ±10% may be subjected to correction at the same or substantially the same correction level. By so doing, it is possible to correct appropriately in-cylinder intake air amount calculation models at other similar conditions.

In the above manner, according to Embodiment 1, when the engine is in a substantially steady state during vehicle operation, the in-cylinder intake air amount calculation model is corrected on the basis of comparison of estimated intake air pressure Pe with measured intake air pressure Ps, whereby it is possible to compensate for error caused by individual differences among engines or sensors and other components, or by change over time in flow passage resistance at the valve location. As a result, accuracy of measurement of in-cylinder intake air amount can be improved on an individual vehicle basis.

C. Embodiment 2 of Calculation Model Correction

Figure 7:
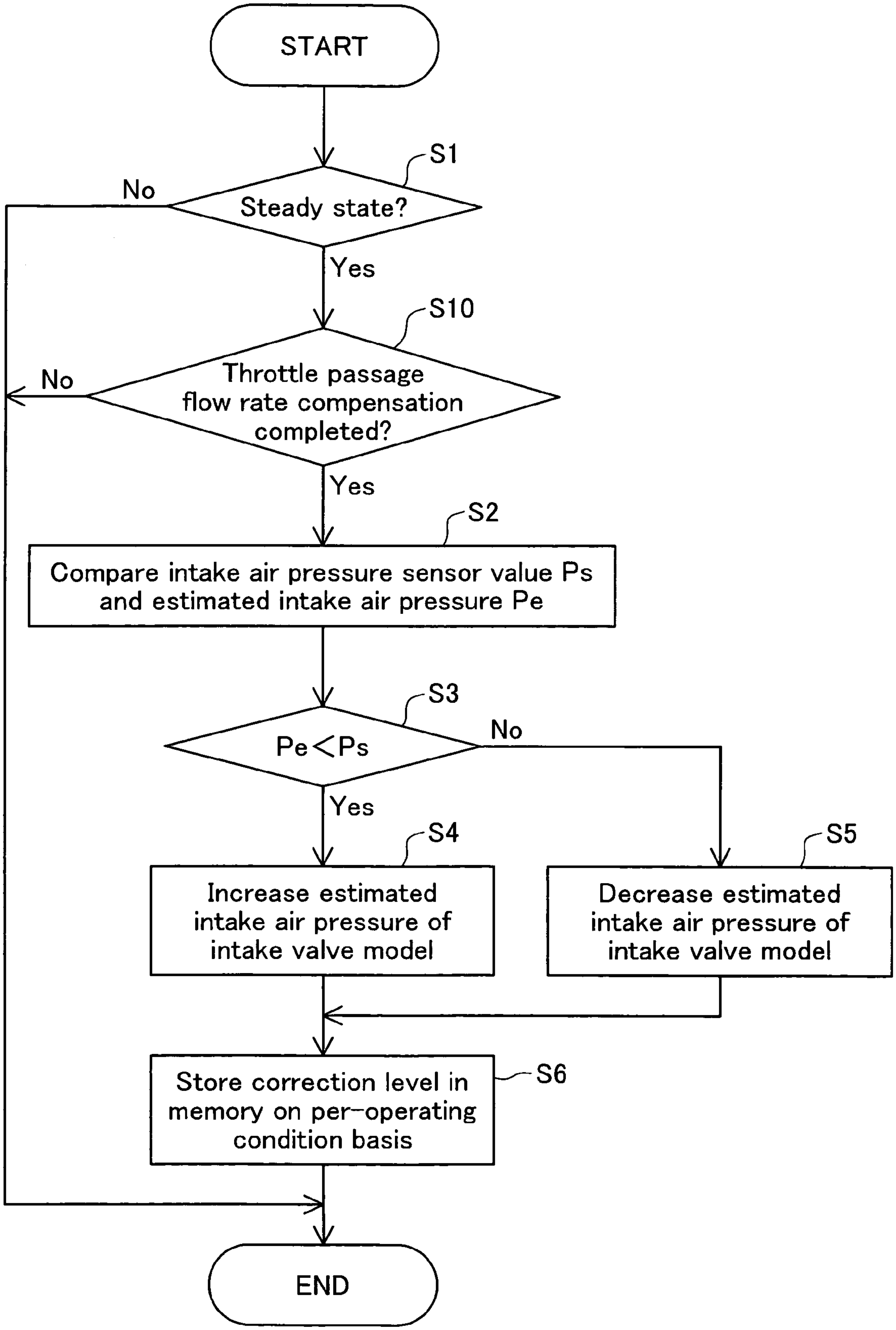
FIG. 7 is a flowchart illustrating the model correction procedure in Embodiment 2.

FIG. 7 is a flowchart illustrating the in-cylinder air charge amount Mc calculation model correction procedure in Embodiment 2. This routine has an additional Step S10 coming between Step S1 and Step S2 in the routine of Embodiment 1 depicted in FIG. 5.

In Step S10, intake air flow rate Ms-measured by the air flow meter 130 is compensated. Specifically, the air flow meter 130 is corrected so that, under steady state operating conditions, the air-fuel ratio measured by the air-fuel ratio sensor 126 (FIG. 1), the fuel injection amount by the fuel injection valve 101, and the intake air flow rate Ms (=Mc) measured by the air flow meter 130 are matched. In the process beginning with Step S2, correction of the in-cylinder intake air amount calculation models is executed in the same manner as in Embodiment 1, using the measured intake air flow rate Ms measured by the air flow meter 130.

Figure 8:
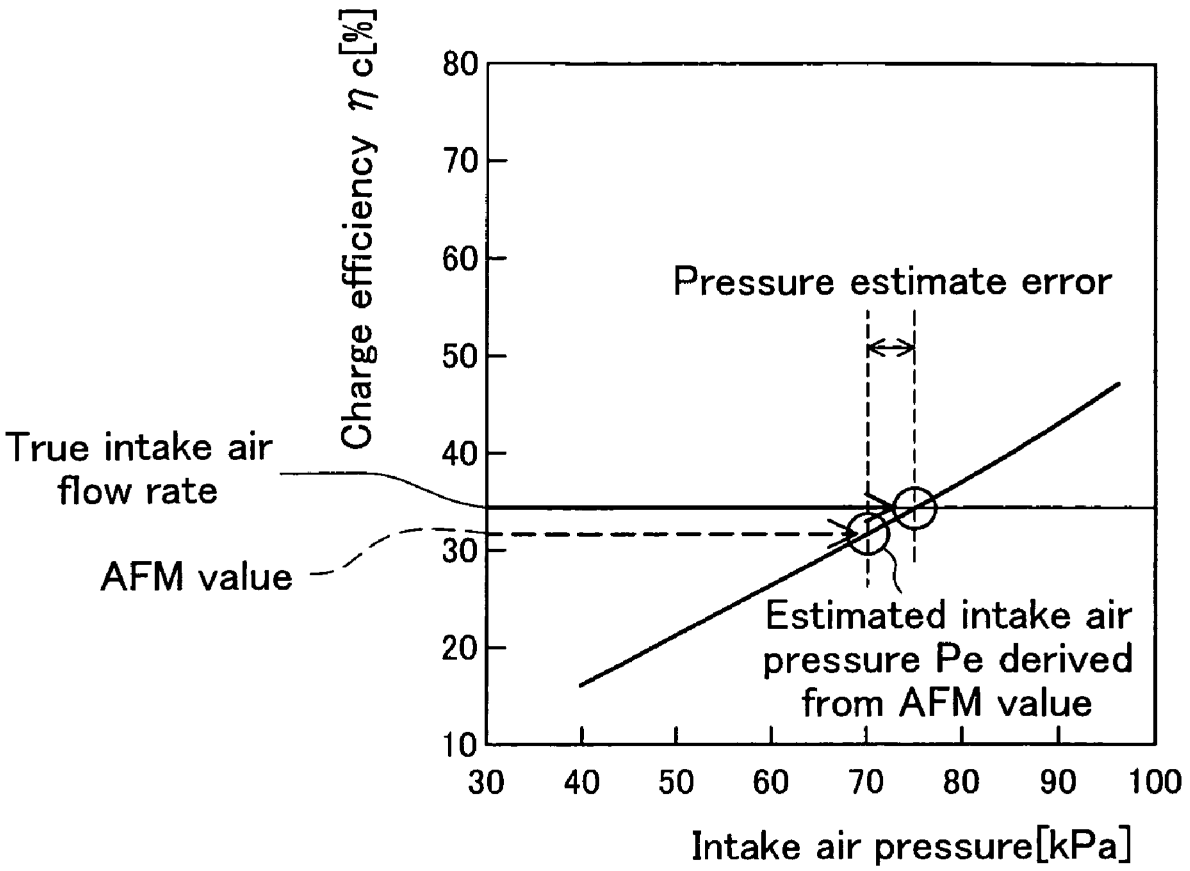
FIG. 8 is a diagram depicting calculation error in estimated intake air pressure Pe caused by error in intake air flow rate Ms measured by the air flow meter 130.

FIG. 8 depicts calculation error in estimated intake air pressure Pe caused by error in intake air flow rate Ms measured by the air flow meter 130. Here, since it is assumed that the engine is in a steady state operating condition, the measured intake air flow rate Ms measured by the air flow meter 130 is proportional to the in-cylinder air charge amount Mc (i.e. charge efficiency $\eta$c). As described in FIGS. 3, 4(A) and 4(B), the estimated intake air pressure Pe derived with the intake piping model 22 is determined on the basis of this measured intake air flow rate Ms. Accordingly, if measured intake air flow rate Ms deviates from the true value, error (deviation) will be produced in estimated intake air pressure Pe. Such deviation in estimated intake air pressure Pe produces calculation error of in-cylinder air charge amount Mc during normal operation. Accordingly, in Embodiment 2, prior to correcting the in-cylinder air charge amount Mc calculation model, the air flow meter 130 is corrected so as to obtain the correct intake air flow rate Ms. As a result, the in-cylinder air charge amount Mc can be calculated with greater accuracy.

Correction of the air flow meter 130 (typically an intake air flow rate sensor) may be carried out on the basis of output of some other sensor besides the air-fuel ratio sensor. For example, correction of the intake air flow rate sensor could be carried out on the basis of torque measured by a torque sensor (not shown).

D: VARIANT EXAMPLES

The invention is not limited to the embodiments and embodiments described hereinabove, and may be reduced to practice in various other forms without departing from the spirit thereof, such as the variant examples described below, for example.

D1: Variant Example 1

Equations (1)–(5) of the in-cylinder air charge amount model used in the embodiments are merely exemplary, it being possible to use various other models instead. Also, it is possible to use parameters other than the three parameters mentioned hereinabove (engine revolution Nen, intake valve working angle $\theta$, and phase $\phi$ of the open valve time period of the intake valve), as operating parameters for specifying operating conditions associated with the in-cylinder air charge amount model. For example, the working angle of the exhaust valve or the phase of the open valve time period thereof may be used as operating parameters for specifying operating conditions.

D2: Variant Example 2

Whereas in the embodiments hereinabove there is employed a model that derives an estimated value Pe of intake air pressure Ps measured by the pressure sensor 138 from measured intake air flow rate Ms measured by the air flow meter 130, and calculate in-cylinder air charge amount Mc from this estimated value Pe, it would be possible to use some other calculation model instead. Specifically, it would be possible to employ, as the calculation model for in-cylinder air charge amount, a model that estimates pressure within the intake air passage from some parameter other than flow rate measured by a flow rate sensor, and that calculates in-cylinder air charge amount using the estimated pressure and flow rate sensor measurements as parameters.

Additionally, whereas in the preceding embodiments correction of calculation models involved deriving an estimated value Pe for intake air pressure Ps measured by the pressure sensor 138, correction of calculation models on the basis of pressure Ps, Pe may be carried out by some other method instead. More generally, correction of calculation models can be executed on the basis of the output signal of a flow rate sensor for measuring intake air flow rate, and the output signal of a pressure sensor for measuring pressure on the intake piping. Correction of calculation models in this way will preferably be carried out with the engine in a substantially steady state operating condition, but typically can also be carried out during vehicle operation.

D3: Variant Example 3

The present invention is not limited to internal combustion engines equipped with a variable valve mechanism, but is applicable also to internal combustion engines whose valve opening characteristics cannot be modified. However, as illustrated in Embodiment 1, the advantages of the invention are particularly notable in internal combustion engines equipped with a variable valve mechanism.

INDUSTRIAL APPLICABILITY

The invention is applicable to a control device for internal combustion engines of various kinds, such as gasoline engines or diesel engines.

What is claimed is:

1. A control device for an internal combustion engine installed in a vehicle, comprising:

a flow rate sensor for measuring fresh air flow rate in an intake air passage connected to a combustion chamber of the internal combustion engine;

a pressure sensor for measuring pressure within the intake air passage;

an air charge amount calculation module, comprised of an intake piping model, an intake valve model and a correction execution module for calculating air charge amount to the combustion chamber according to a calculation model that includes as parameters measurement by the flow rate sensor and pressure within the intake air passage; and the correction execution module for correcting the calculation model based on measurement by the flow rate sensor and measurement by the pressure sensor, wherein the calculation model is a model wherein the intake piping model estimates pressure within the intake air passage based on an output signal of the flow rate sensor, and the intake valve model utilizes the estimated pressure to calculate air charge amount to the combustion chamber, and the correction execution module executes correction of the intake valve model by a difference between the estimated pressure and pressure measured by the pressure sensor.

2. A control device according to claim 1, wherein the internal combustion engine comprises a variable valve mechanism enabling modification of flow passage resistance at a location of an intake valve by means of changing a working angle of the intake valve, and relationships of pressure within the intake air passage to the air charge amount in the computation model are established with reference to operating conditions specified in terms of a plurality of operating parameters that include the working angle of the intake valve.

3. A control device according to claim 2, wherein the correction execution module, by means of executing correction of the calculation model, compensates for error concerning relationship between size of the working angle of the intake valve and flow passage resistance at the intake valve location.

4. A control device according to claim 1, further comprising:

a fuel feed controller for controlling a feed amount of fuel flowing into the combustion chamber; and an air-fuel ratio sensor disposed on an exhaust passage connected to the combustion chamber, wherein the correction execution module is able to correct the flow rate sensor according to a measured air-fuel ratio so that the measured air-fuel ratio measured by the air-fuel ratio sensor, the fuel feed amount established by the fuel feed controller, and the air charge amount determined based on the output signal of the flow rate sensor are consistent with one another, and correction of the calculation model is executed after correction of the flow rate sensor.

5. A control device according to claim 1, wherein the correction execution module executes the correction during a period in which revolution and load of the internal combustion engine are substantially constant.

6. A method for calculating air charge amount in an internal combustion engine installed in a vehicle, comprising:

(a) providing a flow rate sensor for measuring fresh air flow rate in an intake air passage connected to a combustion chamber of the internal combustion engine, and a pressure sensor for measuring pressure within the intake air passage;

(b) calculating air charge amount to the combustion chamber according to a calculation model that includes as parameters measurement by the flow rate sensor and pressure within the intake air passage; and (c) correcting the calculation model based on measurement by the flow rate sensor and measurement by the pressure sensor, wherein the calculation model is a model that estimates pressure within the intake air passage based on an output signal of the flow rate sensor as input into an intake piping model, and utilizes the estimated pressure as input into an intake valve model to calculate air charge amount to the combustion chamber, and the step (c) includes a step of executing correction of the intake valve model by a difference between the estimated pressure and pressure measured by the pressure sensor coincide.

7. A method according to claim 6 wherein the internal combustion engine comprises a variable valve mechanism enabling modification of flow passage resistance at a location of an intake valve by means of changing a working angle of the intake valve, and relationships of pressure within the intake air passage to the air charge amount in the computation model are established with reference to operating conditions specified in terms of a plurality of operating parameters that include the working angle of the intake valve.

8. A method according to claim 7 wherein the step (c) includes compensating for error concerning relationship between size of the working angle of the intake valve and flow passage resistance at the intake valve location, by means of executing correction of the calculation model.

9. A method according to claim 6 wherein the internal combustion engine further comprises:

a fuel feed controller for controlling a feed amount of fuel flowing into the combustion chamber; and an air-fuel ratio sensor disposed on an exhaust passage connected to the combustion chamber, wherein the step (c) includes the steps of:

correcting the flow rate sensor according to a measured air-fuel ratio so that the measured air-fuel ratio measured by the air-fuel ratio sensor, the fuel feed amount established by the fuel feed controller, and the air charge amount determined based on the output signal of the flow rate sensor are consistent with one another; and executing correction of the calculation model after correction of the flow rate sensor.

10. A method according to claim 6 wherein the correction in the step (c) is executed during a period in which revolution and load of the internal combustion engine are substantially constant.

11. A control device for an internal combustion engine installed in a vehicle, comprising:

a first sensor for measuring a parameter which is usable to estimate pressure within an intake air passage;

a second sensor for measuring pressure within the intake air passage; and a correction execution module for correcting air charge amount to the combustion chamber, calculated by an intake valve model, based on pressure estimated by an intake piping model from the parameter measured by the first sensor and pressure measured by the second sensor.

12. A control device for an internal combustion engine installed in a vehicle, comprising:

a first sensor for measuring a parameter which is usable to estimate pressure within an intake air passage;

a second sensor for measuring pressure within the intake air passage; and a correction execution module for correcting air charge amount to the combustion chamber, calculated by an intake valve model, based on the parameter measured by the first sensor and pressure measured by the second sensor, wherein the correction execution module executes the correction of the air charge amount to the combustion chamber after executing correction of the first sensor.

* * * * *